May 14, 1946.　　　F. F. HAUPTMAN　　　2,400,411
MEASUREMENT OF MATERIAL IN CONTAINERS
Filed Aug. 19, 1944　　　4 Sheets-Sheet 1

INVENTOR.
FREDERIC F. HAUPTMAN.
BY
ATTORNEY

May 14, 1946.  F. F. HAUPTMAN  2,400,411
MEASUREMENT OF MATERIAL IN CONTAINERS
Filed Aug. 19, 1944   4 Sheets-Sheet 2
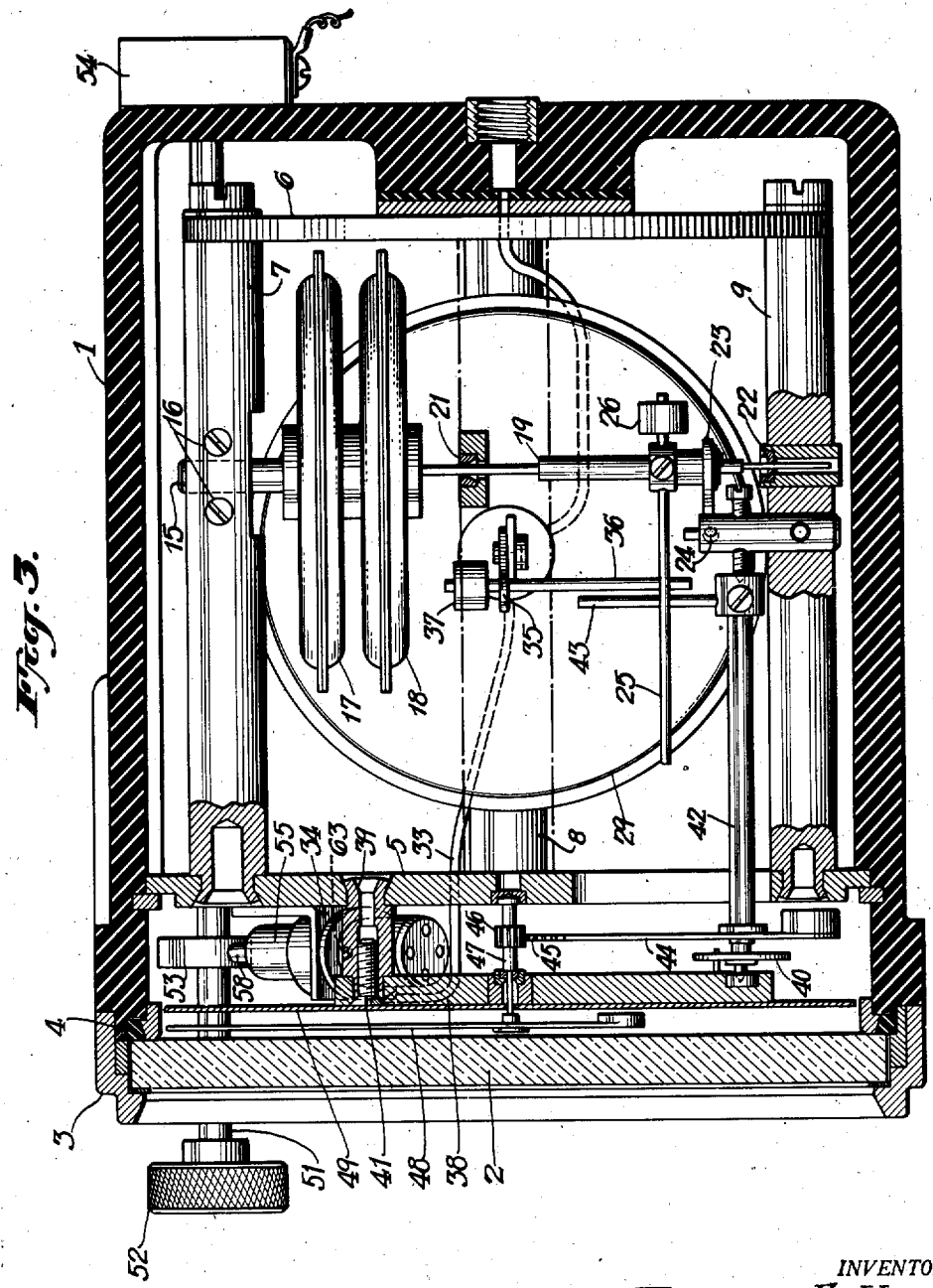
INVENTOR.
FREDERIC F. HAUPTMAN.
BY
ATTORNEY May 14, 1946.  F. F. HAUPTMAN  2,400,411
MEASUREMENT OF MATERIAL IN CONTAINERS
Filed Aug. 19, 1944  4 Sheets-Sheet 3
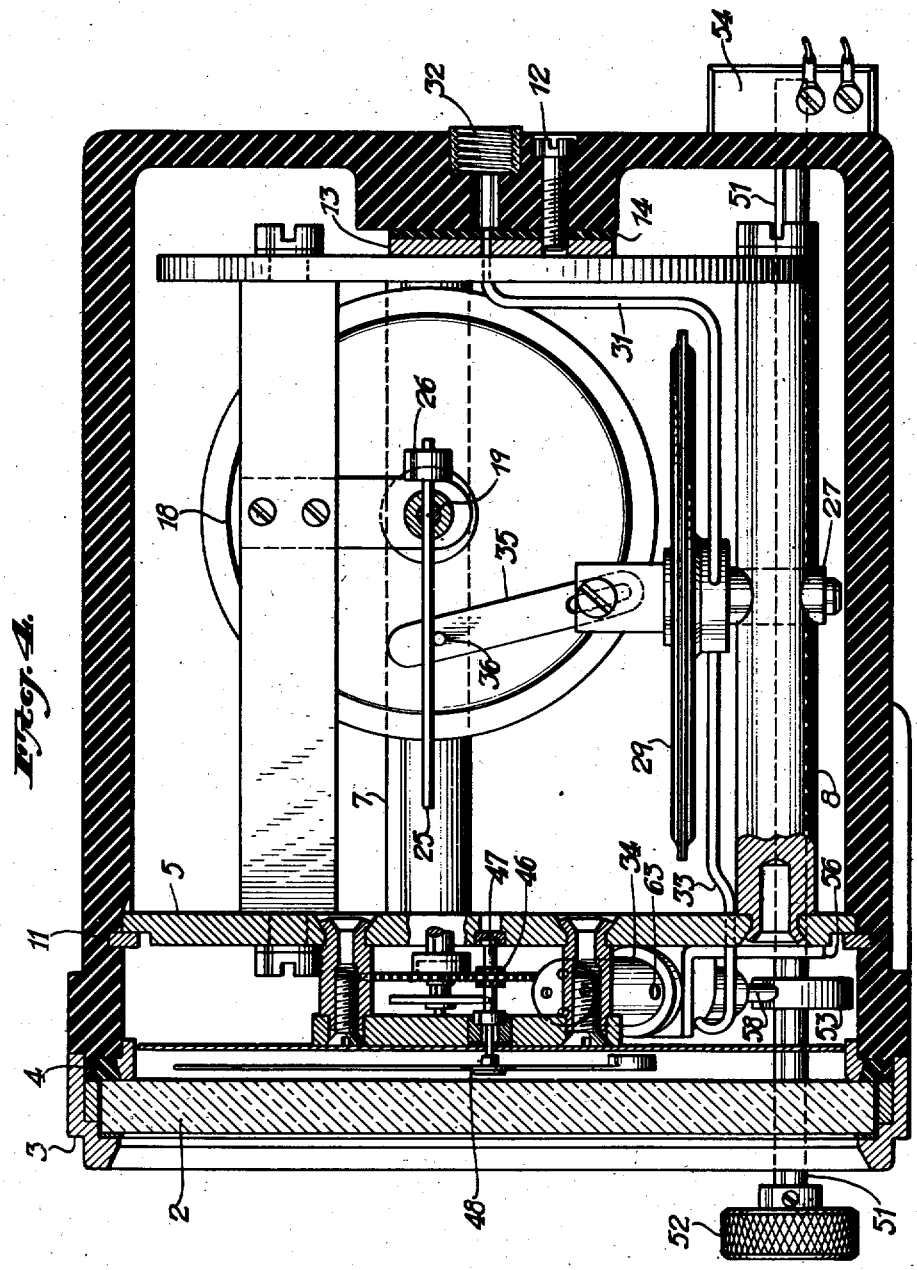
INVENTOR.
FREDERIC F. HAUPTMAN.
BY
ATTORNEY

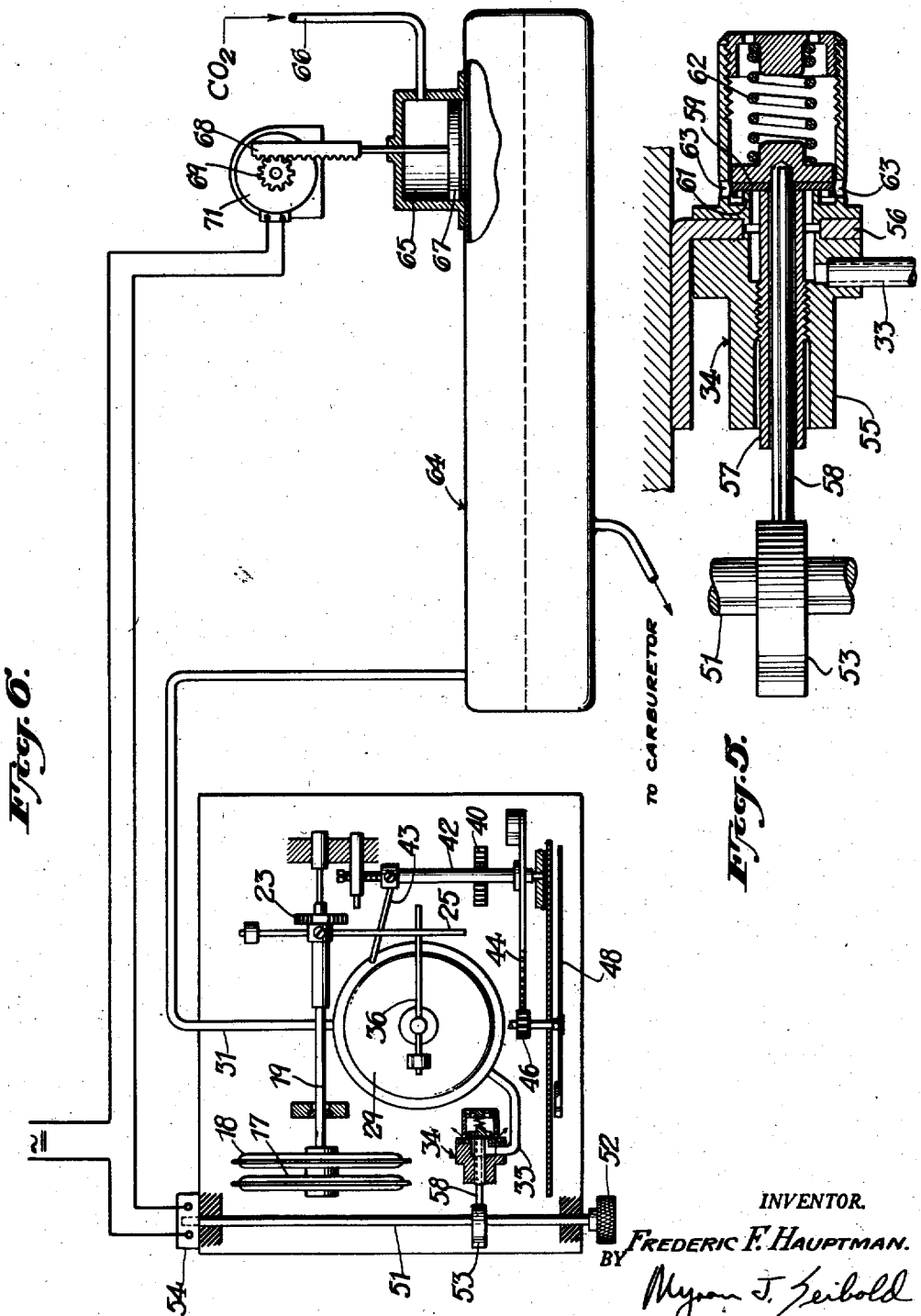

Patented May 14, 1946

2,400,411

UNITED STATES PATENT OFFICE 2,400,411

MEASUREMENT OF MATERIAL IN CONTAINERS

Frederic F. Hauptman, Rego Park, N. Y., assignor to Square D Company, Detroit, Mich., a corporation of Michigan Application August 19, 1944, Serial No. 550,189

10 Claims. (Cl. 73—290)

This invention relates to a system for measuring the quantity of material in a container and to an instrument or gage for use in such system for indicating the quantity measured.

The system, as specifically disclosed, relates to the measurement of fuel quantities present in tanks by means of the increase in pressure therein resulting from the insertion of a measured amount of fluid into the tank. Such systems are particularly applicable for fuel tanks used in aircraft where the height of the tank may be small with respect to its other dimensions and in which variations in level flight may affect the readings indicated on the more conventional instruments based upon the height of the liquid within the tank.

The gage, according to the present invention, provides a means for measuring the quotient of the initial pressure and the increase in pressure resulting from the insertion of a measured quantity of gas into the fuel tank. This measurement, properly interpreted by indicia, indicates the fuel quantity present.

An object of the invention is the provision of an improved fuel quantity measuring system for inserting a measured quantity of gas within a sealed tank and indicating upon a gage the fuel quantity present within the tank independently of the height of the liquid column and the attitude of the tank.

Another object of the invention is a fuel quantity gage indicating the fuel quantity present in a tank by means of the increased pressure therein through the insertion of a measured quantity of fluid.

Other objects and features of the invention will be readily apparent to those skilled in the art from the specification and appended drawings illustrating certain preferred embodiments in which:

Figure 3 is a sectional view on line III—III of Figure 2.

Figure 4 is a sectional view on line IV—IV of Figure 2.

Figure 5 is a detailed sectional view of the manually operated valve taken on line V—V of Figure 2.

Figure 6 is a diagrammatic view of the system and indicator.

Figure 2:
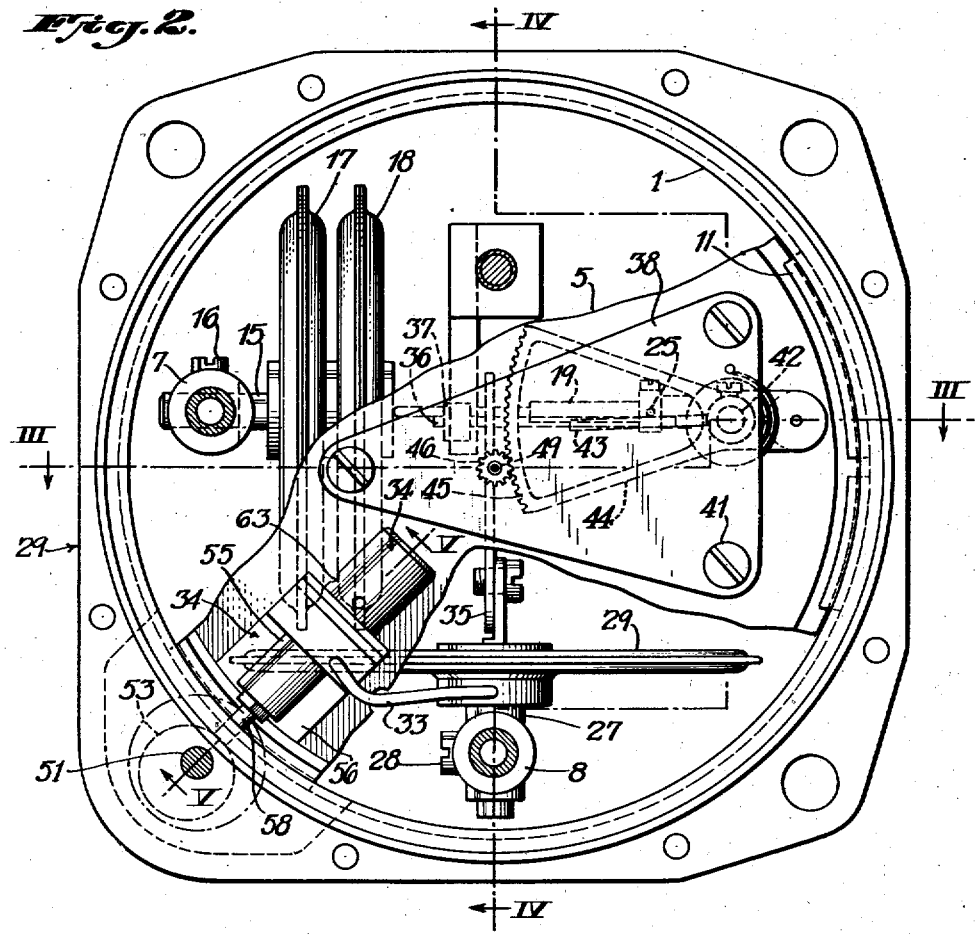
Figure 2 is an enlarged front view of the indicator of Figure 1 with the dial and front cover removed and certain parts broken away to show internal parts.
Figure 1:
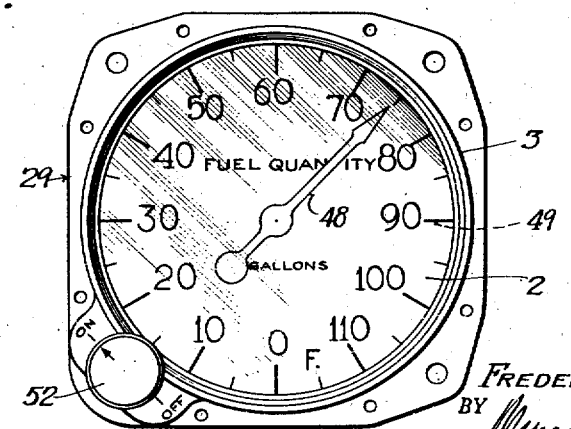
Figure 1 is a front view of the fuel quantity gage or indicator according to the present invention.

The gage or indicator, according to the present invention, comprises an outer cylindrical case 1 having a front transparent coverplate 2 disposed thereagainst in airtight relation by a bezel ring 3, a rubber sealing ring 4 being provided to secure the airtight fit. The mechanism within the casing is supported on a framework formed by a pair of spaced plates 5 and 6 rigidly disposed in spaced relation by the rods, 7, 8 and 9. The assembly formed by the spaced plates 5 and 6, the rods 7, 8, 9, and the operating mechanism mounted thereon is maintained within the casing by the split ring 11 and by means of studs 12 threading into a plate 13 connected to the plate 6. A sealing pad 14 is provided between the plate 13 and the rear wall of the casing to maintain the airtight seal.

On the rod 7, as by means of a pin 15 and stud 16, are a pair of sealed aneroid capsules 17 and 18. The aneroid capsules 17 and 18 are serially connected so that their movement is the additive sum of their individual movements and they bear against a longitudinally movable and rotatable shaft 19 which is provided with a pair of bearings 21 and 22 permitting both rotation and longitudinal movement of the shaft. A spiral spring 23 connected at one end to the shaft and at its other end to a fixed support 24 biases the shaft 19 for rotation in a counterclockwise direction as viewed in Figure 4 and from the bottom of Figure 3 and also biases the shaft longitudinally, upwardly as viewed in Figure 3, against the aneroid capsule 18. Upon the shaft 19 and rotatable therewith is mounted the operating arm 25 counterweighted at 26.

On the rod 8, by a pin 27 and a stud 28, is mounted a diaphragm capsule 29 having its interior connected to a tube 31 leading through plate 13 to a connection 32 at the exterior of the casing and also having its interior connected through tubing 33 to a valve 34 shown in detail in Figure 5. Upon the working surface of the diaphragm capsule 29 is adjustably mounted a link 35 carrying a pin 36 engageable with the operating arm 25 on the shaft 19. A counterweight 37 is provided for the pin 36.

In front of the supporting plate 5 in spaced relation thereto is disposed a supporting plate 38 by means of spacing rods 39 and studs 41. In bearings within the plate 38 and the fixed support 24 is rotatably disposed a shaft 42 having an arm 43 thereon and rotatable therewith which is engaged with the operating arm 25 on the shaft 19 by means of a spiral spring 40 which biases shaft 42 for rotation in a clockwise direction as viewed in Figure 2 and from the left hand end of Figure 3. Rigidly mounted upon the shaft 42 so as to be rotatable therewith is a sector 44 having teeth at 45 meshing with a pinion 46 disposed upon a shaft 47 pivoted in bearings in the supporting plates 5 and 38 and extending through the plate 38 and carrying on its forward end, behind the glass face 2, a pointer 48. A dial 49 bearing indicia of fuel quantity is supported upon the plate 38.

Extending through the casing from front to back thereof is a manual operating rod 51 carrying at its front end a manipulatable knob 52 and having disposed thereon an eccentric cam 53 adapted to engage the operating pin of the valve 34. An electric switch of any conventional form is associated with the indicator at 54 and the manual operating shaft 51 extends longitudinally through the casing into a position to effect operation of the switch as the valve 34 is operated by a rotation of the knob 52. The valve 34 is shown in enlarged detail in Figure 5 as comprising an outer casing 55 supported upon a bracket 56 and having an interior bushing 57 through which extends the operating pin 58 engaged by the eccentric cam 53 on the shaft 51. The valve plate 59 is biased against the valve seat 61 by means of a spring 62. The valve is shown in Figure 5 in its closed position in which communication between the tubing 33 and the interior of the casing 1 is cut off. When the valve is opened such communication is effected through the openings 63.

In Figure 6 the measuring system and the indicating instrument are diagrammatically illustrated. In the instrument the numerals for the principal working parts have been applied as in Figures 2 through 4. The tubing 31 is connected exteriorly of the instrument to the gas space within the tank 64 within which the fuel is to be measured. The tank is provided with a cylinder 65 suppplied with an inert gas such as carbon dioxide through the piping 66. A piston 67 is provided within the cylinder 65 and is moved downwardly through a rack 68 driven by a gear wheel 69 upon the shaft of an operating motor 71 connected to the power supply through the switch 54.

In the simplest form of the invention, a single operation of the piston 67 is utilized to insert the measured quantity of gas within the tank 64. In the simplified diagram of Figure 6, this is accomplished by having the raised position of the piston 67 uncover the outlet of supply pipe 66 to place the interior of the tank and of the cylinder 65 in communication with the CO2 supply. This simplified operation is feasible where the volume of the cylinder 65 is sufficiently large relative to the gas volume within the tank 64 to effect the accurately measurable change of pressure therein. It will, of course, be understood that the pump may otherwise operate or an entirely distinctive mechanism may be utilized within the concept of the invention so long as a measured quantity of fluid is inserted into the chamber to effect the pressure increase.

The indicating gage and system are shown as they have just completed a fuel quantity measurement. The valve 34 is closed and the switch 54 has closed to move the piston 67 to the bottom of the cylinder 65 to inject the measured quantity of gas within the tank. This, through the operating parts of the indicating gage, as will be more fully disclosed, has caused a rotation of the pointer 48 to indicate the fuel quantity within the tank.

The operation of the indicating gage is as follows: The manual knob 52 is first turned to the off position. This opens the valve 34 and connects the interior of the instrument casing 1 with the interior of the diaphragm capsule 29 and with the tank 64. Equal pressures will thereby be placed on the opposite sides of the diaphragm capsule 29 which will thus assume a neutral position. The aneroid capsules 17 and 18 are sealed so that their position will be determined by the pressure within the instrument casing. However, movement of the aneroid capsules does not effect rotation of the indicating pointer, but simply moves the shaft 19 longitudinally to determine the leverage with which the arm 25 engages the arm 43 and hence the amount of rotation of shaft 42 which will be effected by rotation of shaft 19. This determination of the leverage arm or the relative rotation when rotation is to be effected is thus a function of the initial pressure in the tank and in the instrument casing. To effect a fuel quantity reading, the operator then rotates the knob 52 into the on position illustrated in the drawings. This closes valve 34 and electric switch 54. Closing the valve 34 maintains the initial pressure within the instrument casing 1 while permitting change in the pressure within the diaphragm capsule 29 as the pressure in the tank changes. As these pressures become unequal, movement of the diaphragm capsule takes place. When electric switch 54 is closed, the motor 71 is energized and piston 67 moves downwardly to inject the measured quantity of gas into the fuel tank, this measured quantity being determined by the working volume of the cylinder 65. The insertion of this quantity of gas raises the pressure within the tank and this pressure is transmitted to the interior of the diaphragm capsule 29 which expands and moves the pin 36 upwardly as viewed in Figures 2 and 4 and toward the observer as viewed in Figures 3 and 6. This movement of the pin 36 effects rotation of the arm 25 and the shaft 19 in a clockwise direction as viewed in Figure 4. The rotation of the arm 25 permits the arm 43 and its shaft 42 to rotate under the bias of the coil spring 40 in a clockwise direction as viewed in Figure 2. Rotation of shaft 42 effects rotation of sector 44 which in turn rotates pinion 46 and shaft 47 to affect a rotation of the pointer 48. The maximum swing of the pointer 48 will indicate the fuel quantity within the tank. This is a momentary indication which must be observed at its maximum to give the desired reading.

While the schematic diagram of Figure 6 does not indicate any means for reversing the motor 71, it will be understood that these motors conventionally have interior wiring and switching mechanism which will automatically reverse their direction of rotation when they reach the extreme of travel and it is understood that the use of some such conventional arrangement can be utilized to effect a return of the piston 67 to its outer position after the gas quantity has been inserted into the tank.

While no means for regulating the pressure of the carbon dioxide gas supply to the cylinder 65 is shown, it is understood that with variation in the fuel quantity to be measured, a variation in the initial pressure to secure a higher initial value in case of small fuel quantities may be accomplished by any conventional means either automatically or manually. While the use of carbon dioxide gas has been specifically disclosed for injection into the fuel tank, it is to be understood that any gaseous medium may be used. However, this gas is desirable because of its fireproofing qualities.

While certain preferred embodiments of the invention have been specifically disclosed, it is understood that the invention is not limited thereto as many variations will be readily apparent to those skilled in the art and the invention is to be given its broadest possible interpretation within the terms of the following claims.

I claim:

1. In a system for indicating the quantity of material in a container, a diaphragm capsule, a sealed enclosure within which said capsule is disposed, means for establishing within said enclosure the initial pressure within said container, means for inserting a measured quantity of fluid into said container to increase the pressure therein, means for establishing said increased pressure within said diaphragm capsule while maintaining said initial pressure within said enclosure to effect movement of the diaphragm capsule in response to the increased pressure, and indicating means movable in response to movement of the diaphragm capsule to indicate the quantity of material in the container.

2. In a system for indicating the quantity of material in a container, a diaphragm capsule, a sealed enclosure within which said capsule is disposed, means for establishing within said enclosure the initial pressure within said container, means for inserting a measured quantity of fluid into said container to increase the pressure therein, means for establishing within the diaphragm capsule said increased pressure while maintaining said initial pressure within the enclosure to effect movement of the diaphragm capsule in response to said increased pressure, a dial calibrated in units of material quantity, indicating means movable over said dial to indicate material quantity by its relation thereto, and means for effecting movement of said indicating means in response to movement of said diaphragm capsule.

3. In a system for indicating the quantity of material in a container, a diaphragm capsule, a sealed enclosure within which said capsule is disposed, means for establishing within said enclosure the initial pressure within said container, means for inserting a measured quantity of fluid into said container to increase the pressure therein, means for establishing said increased pressure within said diaphragm capsule while maintaining said initial pressure within said enclosure to effect movement of the diaphragm capsule in response to the increased pressure, indicating means movable in response to movement of the diaphragm capsule to indicate the quantity of material in the container, an aneroid capsule within said enclosure, and means for varying the relation between the movements of said indicating means and diaphragm capsule in response to movement of said aneroid capsule.

4. In a system for indicating the quantity of material in a container, a diaphragm capsule, a sealed enclosure within which said capsule is disposed, means for connecting said container and enclosure to equalize the pressure therein, means for closing said connection to maintain said pressure in the enclosure, means for inserting a measured quantity of fluid into said container to increase the pressure therein, means connecting the interior of the diaphragm capsule and the container to apply said increased pressure to move the capsule, and indicating means movable in response to capsule movement to indicate the quantity of material in the container.

5. In a system for indicating the quantity of material in a container, a diaphragm capsule, a sealed enclosure within which said capsule is disposed, means for connecting said container and enclosure to equalize the pressures therein, means for closing said connection to maintain said pressure in the enclosure, means for inserting a measured quantity of fluid into said container to increase the pressure therein, means connecting the interior of the diaphragm capsule and the container to apply said increased pressure to move the capsule, indicating means movable in response to capsule movement to indicate the quantity of material in the container, an aneroid capsule within the enclosure, and means for varying the relation between the movements of the indicating means and diaphragm capsule in response to movement of the aneroid capsule.

6. In an indicating instrument, a sealed enclosure, an aneroid capsule within said enclosure, a diaphragm capsule within said enclosure, means for connecting the interior of the said diaphragm capsule to an exterior pressure source, means for optionally connecting the interior of said enclosure to said exterior pressure source as desired, indicating means, means moving said indicating means in response to movement of said diaphragm capsule, an aneroid capsule within the enclosure, and means for changing the relation of movement of the indicating means and diaphragm capsule in response to movement of said aneroid capsule.

7. In a fuel quantity measuring gage, a sealed enclosure, an aneroid capsule within said enclosure, a diaphragm capsule within said enclosure, means for connecting the interior of said diaphragm capsule to the fuel container, a dial in said enclosure, means for optionally connecting the interior of said enclosure to the fuel container, indicia of fuel quantity disposed on said dial, a pointer movable with respect to said dial to indicate fuel quantity, means for effecting movement of said pointer in response to movement of said diaphragm capsule, and means for changing the relation of the movements of said pointer and diaphragm capsule in response to movement of said aneroid capsule.

8. In a fuel quantity measuring gage, a sealed enclosure, an aneroid capsule within said enclosure, a diaphragm capsule within said enclosure, means for connecting the interior of said diaphragm capsule to the fuel container, means for optionally connecting the interior of said enclosure to said fuel container as desired, a dial within said enclosure, indicia of fuel quantity on said dial, a pointer movable with respect to said dial to indicate fuel quantity, means for effecting movement of said pointer in response to movement of said diaphragm capsule, and means for changing the relation of the movements of said pointer and diaphragm capsule in response to movement of said aneroid capsule.

9. In an indicating instrument, a sealed enclosure, an aneroid capsule within said enclosure, a first rotatable shaft bodily movable by said aneroid capsule, a diaphragm capsule within said enclosure, means for connecting the interior of said diaphragm capsule to an exterior pressure source, means for optionally connecting the interior of said enclosure to the exterior pressure source as desired, means for rotating said first shaft upon movement of said diaphragm capsule, a second rotatable shaft, indicating means, means for moving said indicating means in response to movement of said second rotatable shaft, means for rotating said second rotatable shaft in response to rotation of the said first rotatable shaft, and means whereby the movement bodily of said first shaft by said aneroid capsule changes the ratio of rotative movements of said first and second shafts.

10. In a fuel quantity measuring gage, a sealed enclosure, an aneroid capsule within said enclosure, a diaphragm capsule within said enclosure, means for connecting the interior of said diaphragm capsule to the fuel container, means for optionally connecting the interior of said enclosure to the fuel container as desired, a first rotatable shaft bodily movable longitudinally by said aneroid capsule, means for rotating said first shaft in response to movement of said diaphragm capsule, a second rotatable shaft, means for rotating said second shaft in response to rotation of said first shaft, a dial, indicia of fuel quantity on said dial, a pointer movable over said dial to indicate fuel quantity by its position with relation to said indicia, means for effecting movement of said pointer in response to movement of said second rotatable shaft, and means whereby the longitudinal movement of said first shaft by said aneroid capsule changes the ratio of rotative movements of said first and second shafts.

FREDERIC F. HAUPTMAN.